Patented Nov. 10, 1925.

1,561,095

UNITED STATES PATENT OFFICE.

WILLIAM W. MARLETT, OF GLENDALE, CALIFORNIA.

CEMENT.

No Drawing.   Application filed September 12, 1924.   Serial No. 737,422.

*To all whom it may concern:*

Be it known that I, WILLIAM W. MARLETT, a citizen of the United States, residing at Glendale, in the county of Los Angeles and State of California, have invented a Cement, of which the following is a full and complete specification.

My invention is an improvement in cement or adhesive compositions of that particular class which are used primarily for the purpose of connecting a rubber tire to a wheel, or a rubber surface to a wood or metal surface, ordinarily termed "tire-cement."

Tire-cements in general use are not altogether satisfactory inasmuch as they are liable to harden to the extent of crystallization and therefore break up when subjected to the usual strain between the tire and rim when the wheel is in use, thus the holding efficiency of the same is seriously affected permitting the tire to become loose or creep on the rim, and of course the tire is also likely to become loose or creep with the use of cements which are too pliable—the difficulty being to produce a reliable cement having inherent qualities positively removing these disadvantages inasmuch as they usually result in injury to or destruction of the tire-valve before the looseness of the tire is discovered.

The primary object of my invention therefore is to provide a tire-cement or adhesive composition which will entirely overcome the objections hereinabove mentioned, and I accomplish the desired results in the present instance by employing certain ingredients and mixing them together into a homogeneous constituency by which is produced a cement having that particular degree of pliancy which will assure its desired strength and durability.

A further object of my invention is to provide a cement or adhesive composition having in addition to these desired qualifications the advantages of being waterproof and of a consistency that will enable it to be readily applied.

In manufacturing my improved tire-cement or adhesive composition I employ the following ingredients, for one gallon, in the proportions stated, to wit:—

A resin such as rosin, 3¾ pounds, or 46.87%; coal tar pitch, 1 pound, or 12.50%; linseed oil, ¼ pound, or 3.13%; vulcanized rubber, 1½ pounds, or 18.75%; 60° Bé. test gasoline, 1½ pounds, or 18.75%.

In forming the mixture or cementitious composition the resin, coal tar pitch and linseed oil are put into a receptacle and heated to the boiling point, when the vulcanized rubber is immediately added and the heating of the mass is continued until the last mentioned ingredient is completely dissolved, after which the mixture is allowed to cool. When the mixture has cooled to about 110° or 115° F. the gasoline is incorporated by stirring it in and will bring the mixture or composition to about the consistency of heavy molasses, in which condition it is placed in suitable containers for future use. I have found that the best results are obtained and a very efficient cement produced by mixing the aforementioned essential ingredients in the proportions and manner hereinbefore stated, but it will be apparent that a cement having somewhat similiar characteristics may be produced by slightly varying the proportions and manner of mixing the ingredients, and of course this is contemplated within the scope of the appended claims.

In using the cement to attach a tire to the rim of a wheel it is applied between the meeting surfaces thereof in the usual manner and when set will insure a strong and durable connection, inasmuch as the inherent quality of the composition prepared in the manner hereinbefore stated prevents hardening to the point of becoming brittle possessing just a sufficient amount of pliancy to fully overcome this tendency without affecting its holding quality, and although I have herein referred to the cement or adhesive composition as being of particular advantage in connecting rubber tires to the rims of wheels it may be used in cementing other parts or objects together, and as a coating for insulating purposes, &c.

In specifying that the cement has a certain degree of pliancy this is not intended to mean that there is any actual yielding of the cement when in use—to affect its adhesive strength—but merely in contradistinction to that degree of hardness by which the material is liable to crystallize or become brittle and break up.

I claim:

1. A cement composed of resin, coal tar pitch, linseed oil, vulcanized rubber, and a sufficient quantity of gasoline to bring the mixture to the consistency of heavy molasses.

2. A cement composed of a mixture of 3¾ pounds of resin, 1 pound of coal tar pitch, ¼ pound of linseed oil, 1½ pounds of vulcanized rubber, and 1½ pounds of 60° Bé. test gasoline.

WILLIAM W. MARLETT.